US008079396B2

(12) United States Patent
Rachkov

(10) Patent No.: US 8,079,396 B2
(45) Date of Patent: *Dec. 20, 2011

(54) ADJUSTABLE MICRO DEVICE FEEDER

(75) Inventor: Rossen Atanassov Rachkov, Monroe, WA (US)

(73) Assignee: Leannoux Properties AG L.L.C., Wilmington, DE (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/348,843

(22) Filed: Jan. 5, 2009

(65) Prior Publication Data

US 2009/0107638 A1 Apr. 30, 2009

Related U.S. Application Data

(63) Continuation of application No. 10/759,759, filed on Jan. 15, 2004, now Pat. No. 7,472,737.

(60) Provisional application No. 60/440,479, filed on Jan. 15, 2003.

(51) Int. Cl.
*B32B 15/00* (2006.01)

(52) U.S. Cl. ............ 156/539; 156/580; 226/79; 226/86; 226/137; 226/174; 226/179; 242/615.3

(58) Field of Classification Search ........................ None
See application file for complete search history.

(56) References Cited

U.S. PATENT DOCUMENTS

| 1,247,228 | A | 11/1917 | Cornbrooks et al. |
| 1,840,216 | A | 1/1932 | Tormo |
| 1,972,555 | A | 9/1934 | Fear |
| 2,420,895 | A | 5/1947 | Merriman |
| 2,749,068 | A | 6/1956 | Wayman |
| 3,146,982 | A | 9/1964 | Budnick |
| 3,770,123 | A | 11/1973 | Mraz |
| 3,910,416 | A | 10/1975 | Payne |
| 4,400,105 | A | 8/1983 | Yeager et al. |
| 4,501,064 | A | 2/1985 | DiNozzi et al. |
| 4,527,324 | A | 7/1985 | Dean et al. |
| 4,621,406 | A | 11/1986 | Fujiwara et al. |
| 4,675,993 | A | 6/1987 | Harada |
| 4,747,479 | A | 5/1988 | Herrman |
| 4,775,277 | A | 10/1988 | Zeleny |
| 4,819,178 | A | 4/1989 | Isayama et al. |
| 4,917,556 | A | 4/1990 | Stark et al. |
| 5,036,488 | A | 7/1991 | Motarjemi |

(Continued)

FOREIGN PATENT DOCUMENTS

DE 196127813 2/1997

(Continued)

OTHER PUBLICATIONS

"BP-6500 In-Line Programming System brochure", *BP Microsystems, Inc.*, (1999), 2 pages.

(Continued)

*Primary Examiner* — Philip Tucker
*Assistant Examiner* — Kimberly McClelland

(57) ABSTRACT

A micro device feeder is provided which is adjustable to accommodate micro devices supplied on tapes with different widths. A mounting plate has a movable drive plate slidably mounted thereto. An input mechanism on the movable drive plate receives micro devices contained in a tape and advances the tape under motor drive. A feeder width adjustment mechanism is interposed between the mounting plate and the movable drive plate for positioning of the movable drive plate relative to the mounting plate for accommodating tapes with different widths.

20 Claims, 4 Drawing Sheets

U.S. PATENT DOCUMENTS

| | | | |
|---|---|---|---|
| 5,193,268 | A | 3/1993 | Ono et al. |
| 5,209,132 | A | 5/1993 | Chayamichi et al. |
| 5,268,059 | A | 12/1993 | Olson |
| 5,299,902 | A | 4/1994 | Fujiwara et al. |
| 5,312,304 | A | 5/1994 | Vetter |
| 5,322,253 | A | 6/1994 | Stevens |
| 5,330,043 | A | 7/1994 | Stuckey |
| 5,342,460 | A | 8/1994 | Hidese |
| 5,419,802 | A | 5/1995 | Nakatsuka et al. |
| 5,422,554 | A | 6/1995 | Rohde |
| 5,535,873 | A | 7/1996 | Sakamoto et al. |
| 5,536,128 | A | 7/1996 | Shimoyashiro et al. |
| 5,544,411 | A | 8/1996 | Kano et al. |
| 5,547,537 | A | 8/1996 | Reynolds et al. |
| 5,548,554 | A | 8/1996 | Pascucci et al. |
| 5,588,614 | A | 12/1996 | Takada et al. |
| 5,598,986 | A | 2/1997 | Ando et al. |
| 5,692,292 | A | 12/1997 | Asai et al. |
| 5,695,071 | A | 12/1997 | Ross et al. |
| 5,706,576 | A | 1/1998 | Iwasaki et al. |
| 5,725,140 | A | 3/1998 | Weber et al. |
| 5,805,472 | A | 9/1998 | Fukasawa |
| 5,806,745 | A | 9/1998 | Irwin |
| 5,820,679 | A | 10/1998 | Yokoyama et al. |
| 5,870,820 | A | 2/1999 | Arakawa et al. |
| 5,881,968 | A | 3/1999 | Hsu |
| 5,896,652 | A | 4/1999 | Tagata et al. |
| 5,941,674 | A | 8/1999 | Briehl |
| 5,955,857 | A | 9/1999 | Kwon et al. |
| 5,976,199 | A | 11/1999 | Wu et al. |
| 5,992,791 | A | 11/1999 | Tsuda et al. |
| 6,024,526 | A | 2/2000 | Slocum et al. |
| 6,055,632 | A | 4/2000 | Deegan et al. |
| 6,082,603 | A | 7/2000 | Takada et al. |
| 6,082,950 | A | 7/2000 | Altwood et al. |
| 6,111,211 | A | 8/2000 | Dziedzic et al. |
| 6,139,246 | A | 10/2000 | Briehl |
| 6,154,954 | A | 12/2000 | Seto et al. |
| 6,169,935 | B1 | 1/2001 | Iwasaki et al. |
| 6,173,750 | B1 | 1/2001 | Davis et al. |
| 6,196,783 | B1 | 3/2001 | Foster |
| 6,202,728 | B1 | 3/2001 | Takada et al. |
| 6,202,913 | B1 | 3/2001 | Takada et al. |
| 6,210,079 | B1 | 4/2001 | Teoh et al. |
| 6,227,755 | B1 | 5/2001 | Hata et al. |
| 6,229,323 | B1 | 5/2001 | Tverdy et al. |
| 6,230,067 | B1 | 5/2001 | White |
| 6,241,459 | B1 | 6/2001 | Canella et al. |
| 6,261,047 | B1 | 7/2001 | Kubota |
| 6,269,279 | B1 | 7/2001 | Todate et al. |
| 6,296,104 | B1 | 10/2001 | Ito et al. |
| 6,315,182 | B1 | 11/2001 | Chen |
| 6,340,266 | B1 | 1/2002 | Bolotin et al. |
| 6,364,184 | B1 | 4/2002 | Hauck et al. |
| 6,379,098 | B1 | 4/2002 | Shibasaki |
| 6,427,096 | B1 | 7/2002 | Lewis et al. |
| 6,442,446 | B1 | 8/2002 | Nakamura et al. |
| 6,449,523 | B1 | 9/2002 | Johnson et al. |
| 6,474,527 | B2 | 11/2002 | Miller |
| 6,519,504 | B1 | 2/2003 | Soraoka et al. |
| 6,532,395 | B1 | 3/2003 | Bolotin |
| 6,535,780 | B1 | 3/2003 | Anderson et al. |
| 6,591,486 | B1 | 7/2003 | Bolotin |
| 6,647,303 | B1 | 11/2003 | Johnson et al. |
| 6,666,365 | B1 | 12/2003 | Feldman |
| 7,220,095 | B2 | 5/2007 | Lyndaker et al. |
| 7,472,737 | B1 * | 1/2009 | Rachkov .................. 156/539 |
| 2002/0007227 | A1 | 1/2002 | Prentice et al. |

FOREIGN PATENT DOCUMENTS

| | | |
|---|---|---|
| DE | 19801978 | 7/1999 |
| EP | 0517439 | 12/1992 |
| EP | 08002685 | 1/1996 |
| EP | 1018862 | 7/2000 |
| EP | 1093332 | 4/2001 |
| GB | 2318664 | 4/1998 |
| JP | 5856388 | 2/1985 |
| JP | 63293812 | 11/1988 |
| JP | 03205215 | 9/1991 |
| JP | 10229295 | 8/1998 |
| JP | 10247797 | 9/1998 |
| JP | 10249650 | 9/1998 |
| JP | 11083943 | 3/1999 |
| JP | 200153499 | 2/2001 |
| WO | WO-9612396 | 4/1996 |
| WO | WO-99/12406 | 3/1999 |

OTHER PUBLICATIONS

"BP-6500 In-Line Programming System Data Sheet", *BP Microsystems, Inc.*, (1999), 1 page.

""BP-6500 In-Line Programming & Fifth Generation Technology"", *BP Microsystems, Inc.*, (1999), 7 pages.

"Patent Abstracts of Japan", vol. 1996, No. 05, May 31, 1996 and JP 08 002685 A (Amada Co LTD; OTHERS:01) Jan. 9, 1996 abstract, vol. 1996, No. 05, May 31, 1996 and JP 08 002685 A (Amada Co LTD; OTHERS:01), Jan. 9, 1996 abstract,(Sep. 1, 1996).

* cited by examiner

ADJUSTABLE MICRO DEVICE FEEDER

RELATED APPLICATIONS

This application is a continuation of and claims priority to U.S. application Ser. No. 10/759,759, filed on Jan. 15, 2004, which in turn claims priority to U.S. Provisional Application No. 60/440,479, filed Jan. 15, 2003, the disclosures of which are incorporated by reference in their entirety herein.

BACKGROUND

Certain operations of electronic circuit board assembly involve supplying micro devices by a micro device feeder to a robotic handling system. The micro devices include a broad range of electronic and mechanical devices, such as programmable devices. Examples of programmable devices include, but are not limited to, devices such as Flash memories (Flash), electrically erasable programmable read only memories ($E^2$PROM), programmable logic devices (PLDs), field programmable gate arrays (FPGAs), and microcontrollers.

The micro device feeders are generally aligned and connected underneath the robotic handling system. The micro devices are typically supplied in tape on reel. The tape includes a plurality of pockets for containing the micro devices. Typically, there is one pocket across the width of the tape. The tape has sprocket holes or perforations in one side so that it can be driven through the micro device feeder.

The micro device feeder has a frame upon which a motor and pulley arrangement is mounted to drive a sprocket, which engages the perforations to linearly drive the tape through the micro device feeder. The frame also carries a spring-loaded backup plate to support the tape and also accommodate any sudden variations in tension in the tape.

The robotic handling system removes the micro devices as the micro device feeder in the tape linearly presents them and places them on buffer areas of the micro device feeder or directly on printed circuit boards moving through an electronic assembly line or manufacturing system. In high-speed systems, the robotic handling systems may include linearly moving pick-and-place mechanisms. In such a system, the centerline of the linearly moving pick-and-place mechanism typically coincides with the centerline of the pockets in the linearly moving tape.

One problem associated with the handling of micro devices carried on tapes is that different micro device feeders are usually needed for different sizes of micro devices because different sizes of micro devices are typically supplied in different sizes of tapes. For example, three different micro device feeders are typically required for 16-, 24-, and 32-millimeter wide tape. The reason for requiring a different micro device feeder is that the centerline of the linearly moving pick-and-place mechanism doesn't typically coincide with the centerline of the pockets in the linearly moving tape for different tape widths because of the perforations in the side of the tape.

The perforations in the tape typically cause a different offset between the centerline of the pockets and the centerline of the tape for each different tape width. Since the frame is connected to the robotic handling system, the motor and pulley arrangement, and the sprocket, the centerline of the linearly moving pick-and-place mechanism is fixed relative to the centerline of the sprocket. The centerline of the sprocket fixes the centerline of the perforations, which means that the offset may cause the centerline of the pick-and-place mechanism to not coincide with the centerline of the pockets.

A typical company may handle different size micro devices supplied in tapes with different size tape widths, and thus require a large number of different size micro device feeders, which may be both inconvenient and expensive.

Different approaches have been taken to try to solve this problem. One approach involves using a tape module, which forms a portion of the micro device feeder. The tape module is replaced for supplying micro devices contained in tapes with different widths. Therefore, instead of replacing the entire micro device feeder to accommodate for different size tape, only the corresponding tape module needs to be replaced. However, the tape module may constitute almost half of the mechanism of a micro device feeder, so it is still inconvenient and expensive to stock large number of tape modules to handle different size tapes.

SUMMARY

An adjustable micro device feeder system is described in accordance with one or more embodiments. The system is easily adjustable to accommodate micro devices supplied on tapes with different widths.

The adjustable micro device feeder system includes, in one or more embodiments, a micro device feeder, which is adjustable to accommodate micro devices supplied on tapes with different widths. A mounting plate has a movable drive plate slidably mounted thereto. An input mechanism on the movable drive plate receives micro devices contained in a tape and is configured to advance the tape under motor drive. A feeder width adjustment mechanism is interposed between the mounting plate and the movable drive plate for positioning of the movable drive plate relative to the mounting plate for accommodating tapes with different widths.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
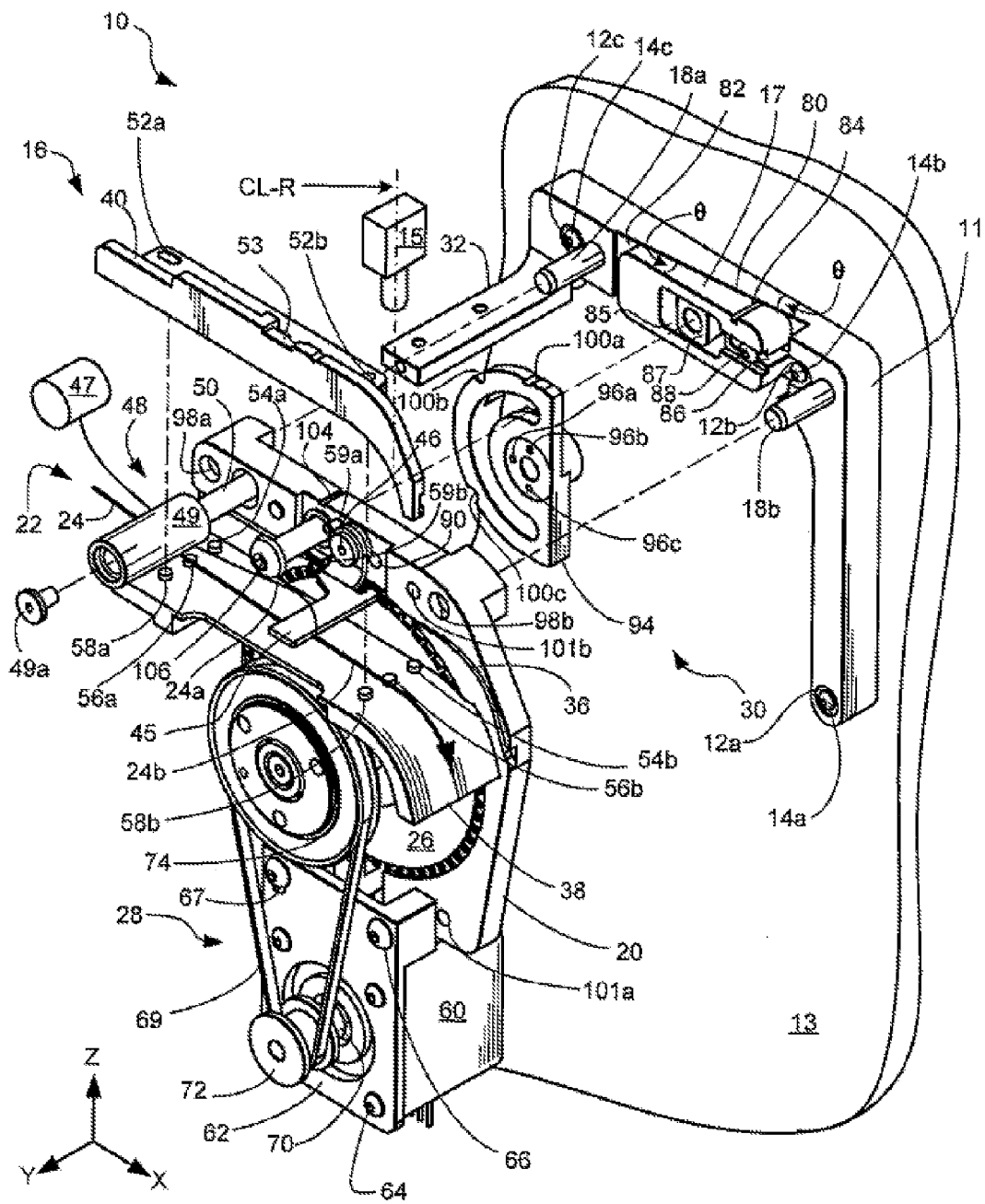
FIG. 1 is an isometric exploded view of one example of an adjustable micro device feeder system in accordance with one or more embodiments.

An adjustable micro device feeder system is described. In the following description, specific details are given to aid in understanding embodiments of the adjustable micro device feeder system. However, it will be apparent that embodiments may be implemented without these specific details.

In order to avoid obscuring the embodiments discussed below, some well-known system configurations and process steps are not disclosed in detail. Likewise, the drawings showing embodiments of the apparatus are semi-diagrammatic and not necessarily to scale. Additionally, some of the dimensions of the discussed embodiments are for clarity of presentation and are shown as exaggerated in the FIGs. Also, where multiple embodiments are disclosed and described having some features in common, for clarity and ease of illustration, description, and comprehension thereof, the same numbers are used in the drawing FIGs. to relate to the same elements.

Example Structure

Referring now to FIG. 1, therein is shown an isometric view of a feeder system 10 constructed according to one or more embodiments. The term "vertical" as used herein is defined as a plane parallel to the height and width of a mounting plate 11, regardless of its orientation. The term "horizontal" refers to a direction perpendicular to the vertical as just defined. Terms, such as "on", "above", "below", "bottom", "top", "side", "higher", "lower", "over", and "under", are defined with respect to the horizontal plane. The terms "X-direction", "Y-direction", and "Z-direction" as used herein is represented by the respective orientation as shown in FIG. 1.

The mounting plate 11 includes three mounting holes 12a, 12b, and 12c. The mounting plate 11 is secured to a main frame 13 using screws 14a, 14b, and 14c, which fit respectively in mounting holes 12a, 12b, and 12c. The feeder system 10 is coupled to the mounting plate 11 and is mounted on the main frame 13 using the mounting plate 11. The main frame 13 also carries a robotic handling system 15 (with a centerline CL-R).

The feeder system 10 includes a feeder mechanism 16, the mounting plate 11, an alignment block 17 mounted to the mounting plate 11, and a pair of guide pins 18a and 18b for guiding the feeder mechanism 16 and other mechanism mounted to it (which will later be described) when the feeder system 10 is repositioned for different tape widths in the Y-direction and locate it in the X- and Z-direction. The feeder mechanism 16 includes a movable drive plate 20 coupled to the mounting plate 11, an input mechanism 22 for receiving and guiding a tape 24 (represented by an arrow showing its linear path) containing micro devices (not shown), a tape driver or a sprocket 26 for engaging edge perforations in and advancing the tape 24, a drive mechanism 28 for driving the sprocket 26, and a feeder width adjustment mechanism 30.

The feeder width adjustment mechanism 30 permits adjustment of the feeder system 10 to accommodate tapes with different widths; i.e., different offsets between the centerline of the tape and the centerline of the different size pockets in the tape 24.

The engagement of the sprocket 26 in the perforations of the tape 24 assures positive linear movement of the tape 24 without Y-direction movement in and out from the main frame 13. The tape 24 includes a cover tape 24a and a carrier tape 24b. The carrier tape 24b has a plurality of pockets (not shown) for holding micro devices.

The movable drive plate 20 includes a guide mechanism 36 for accommodating the edges of the tape 24 proximate the perforations of the tape 24. In one embodiment, the guide mechanism 36 includes a groove.

The input mechanism 22 includes an external tape-guide mounting bracket 32 attached to the mounting plate 11 for supporting the tape 24, a guide carrier 38 mounted to the movable drive plate 20 for supporting the tape 24, and a tape guide 40 mounted to the guide carrier 38 for accommodating the edge portion of the tape 24.

The input mechanism 22 also includes a cover tape removal mechanism 45 rotatably mounted to the movable drive plate 20 using a shaft 46 for removing the cover tape 24a, a cover tape mechanism 47 which handles disposal of the cover tape 24a by rolling it on to a spool or crushing it for later removal and disposal, and a tape-presence sensor assembly 48. The tape-presence sensor assembly 48 includes a tape-presence sensor roller 49, a sensor pin 50, and a pivot pin 51 for detecting the removal of cover tape 24a.

In one or more embodiments, the cover tape removal mechanism 45 includes a peel bar. In one or more embodiments, the cover tape removal mechanism 45 may be a roller or other mechanism(s) suitable for removing the cover tape 24a.

The tape guide 40 includes a feature set. In this embodiment, the feature set includes openings 52a and 52b. The tape guide 40 also includes a notch 53 formed on its top surface.

The guide carrier 38 includes three pairs of projections 54a and 54b, 56a and 56b, and 58a and 58b. In one embodiment, the tape guide 40 includes magnets (not shown) built into it and the guide carrier 38 is made of a ferro-magnetic material. The tape guide 40 is removably attached to the guide carrier 38 using the magnetic force created between the magnets and the ferro-magnetic material. Depending on the width of the tape 24, the tape guide 40 is positioned on the guide carrier 38 by engaging openings 52a and 52b, with one of three pairs of projections 54a and 54b, 56a and 56b, and 58a and 58b.

In one embodiment, opening 52a is a slot opening, and opening 52b is a circular opening.

The movable drive plate 20 further includes an upper pin 59a and a lower pin 59b. In accordance with one or more embodiments, the cover tape removal mechanism 45 is prevented from rotating around the shaft 46 beyond its operative location by the lower pin 59b and the notch 53 in the tape guide 40. When the tape guide 40 is to be switched between the pairs of projections 54a and 54b, 56a and 56b, and 58a and 58b, the cover tape removal mechanism 45 is rotated where it is supported in position by the upper pin 59a. After the tape guide 40 is switched to engage with another pair(s) of the pin pairs, the cover tape removal mechanism 45 is rotated where it is again supported in position by the lower pin 59b and the notch 53.

Figure 3:
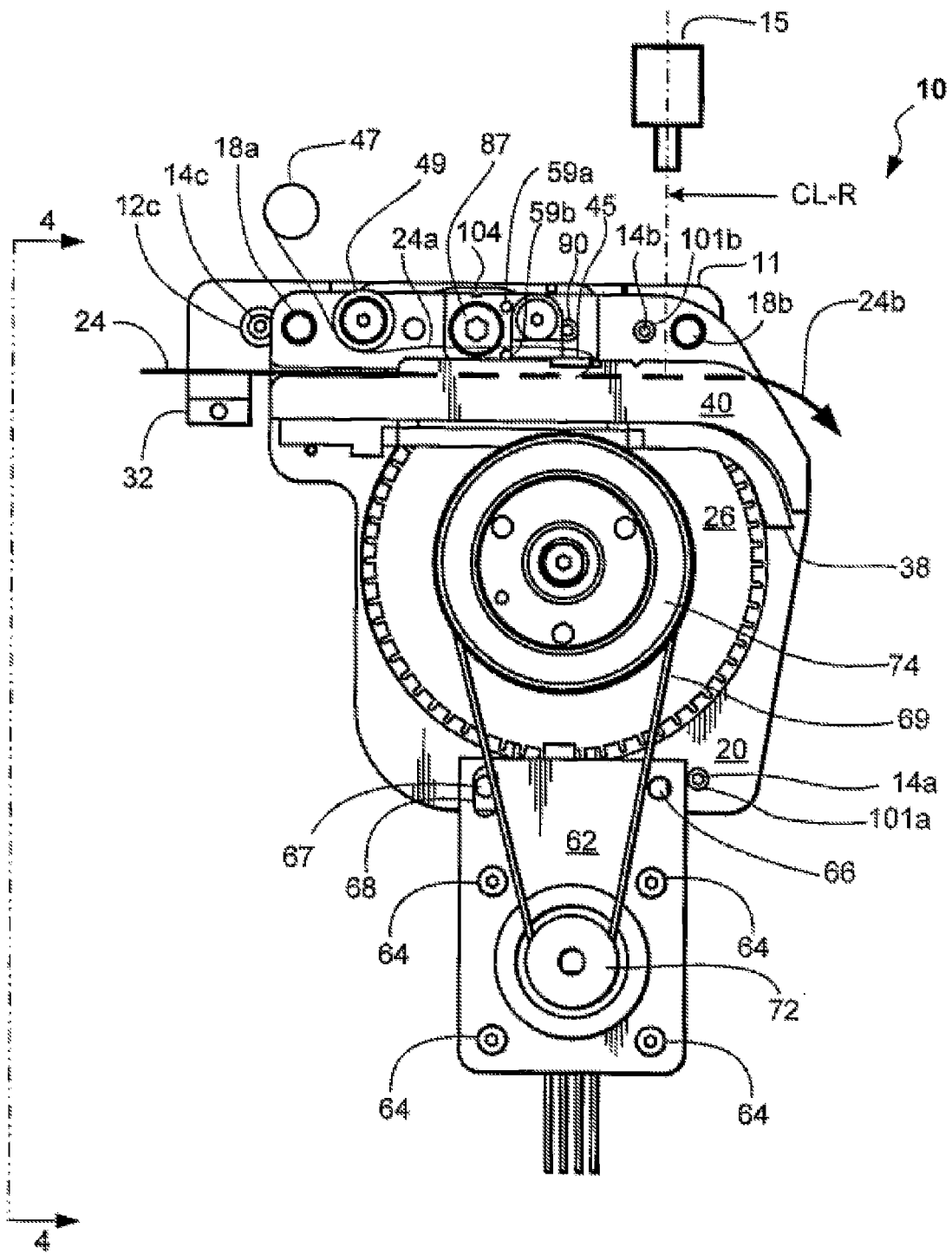
FIG. 3 is a side view of the adjustable micro device feeder system of FIG. 1 in accordance with one or more embodiments.

The drive mechanism 28 includes, in accordance with one or more embodiments, a motor 60 mounted on a motor bracket 62 using screws 64, which are illustrated in FIG. 3. In FIG. 3, the motor bracket 62 is shown mounted to the movable drive plate 20 using screws 66 and 67. The motor bracket 62 is pivotable around the screw 66 and the screw 67 rides in a screw slot 68 to allow adjustment and holding of the motor bracket 62, and proper tensioning of a belt 69.

Referring back to FIG. 1, the motor 60 includes a drive shaft 70 and a motor pulley 72 mounted on the drive shaft 70. The motor pulley 72 drives a sprocket pulley 74 through the belt 69 from the motor 60. The adjustment of the motor bracket 62 allows proper tensioning of the belt 69. In accordance with one or more embodiments, a tensioning mechanism may be provided to maintain the proper tension on the belt 69.

The alignment block 17 includes an alignment surface 80 formed at an angle of 0° with the lateral surface of the alignment block 17. The alignment surface 80 abuts a mounting plate surface 82 of the mounting plate 11. The mounting plate surface 82 is also formed at an angle of about 0° with the back surface of the mounting plate 11.

The alignment block 17 includes a top slot 84, a main slot 85, and a side slot 86. The alignment block 17 is secured to the mounting plate 11 using a screw 88, which is positioned within the side slot 86, and rests with the main slot 85 on a guide block 87, which is part of the mounting plate 11. When the screw 88 is loosened, the alignment block 17 can be slid along the side slot 86 and the guide block 87 in the X-direction on alignment surface 80.

A screwdriver may be used to push against the top slot 84 to move the alignment block 17 in the X-direction to provide fine adjustment in the Y-direction position of the movable drive plate 20. After a desired alignment is completed, the alignment block 17 is secured to the mounting plate 11 using the screw 88. In this embodiment, the screw 88 is tightened or loosened using a small Allen wrench extended through a hole 90 formed on the movable drive plate 20. Other types of screws or securing devices may be used. In an embodiment, 0° is about 6° to provide fine adjustment in the millimeter range between the mounting plate 11 and the movable drive plate 20.

Figure 2:
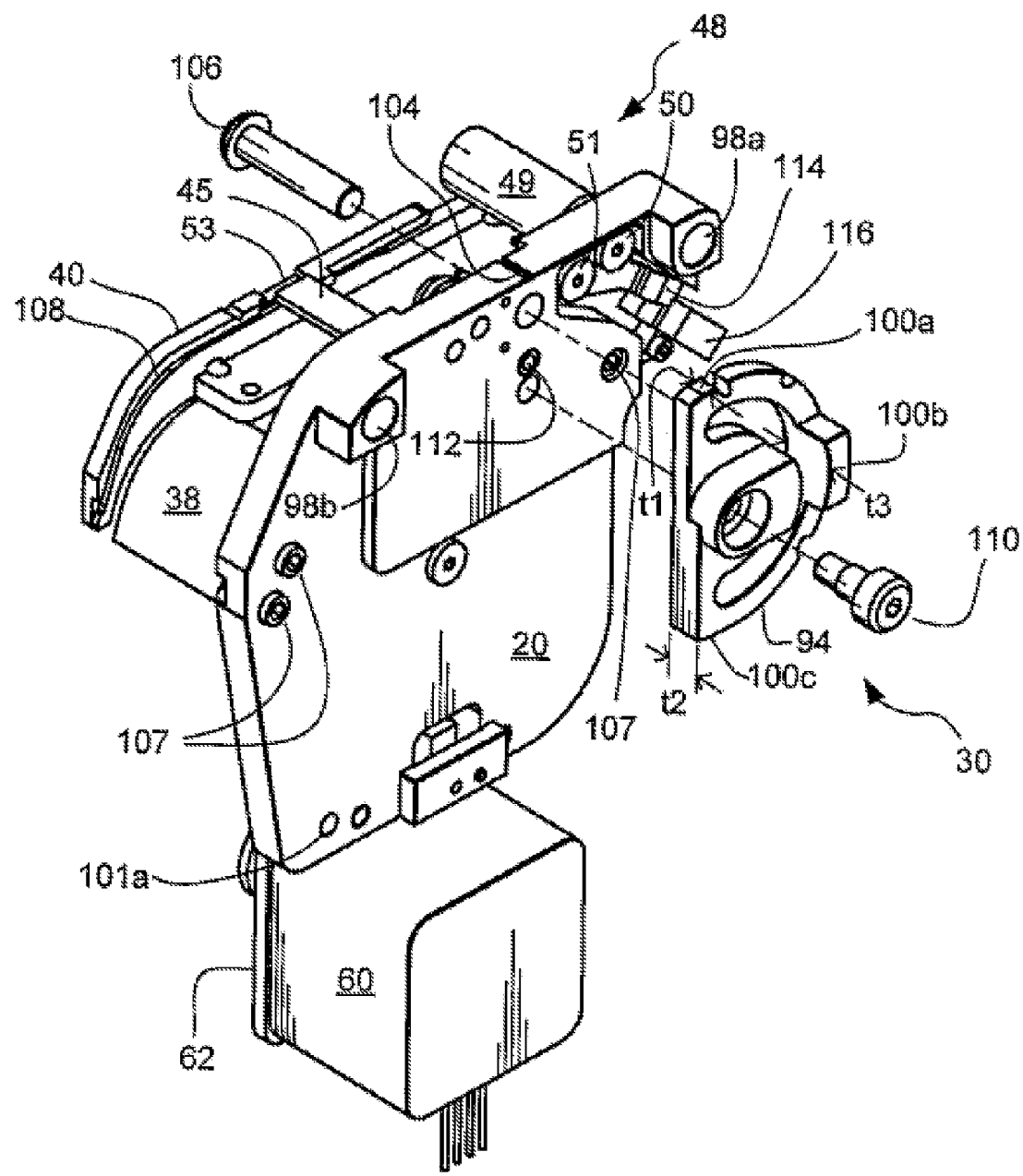
FIG. 2 is another isometric exploded view of the adjustable micro device feeder system of FIG. 1 in accordance with one or more embodiments.

The feeder width adjustment mechanism 30 includes a 3-position spacer 94. The 3-position spacer 94 includes three thicknesses t1, t2, and t3, which are shown in FIG. 2. The thicknesses t1, t2, and t3 are used for spacing the movable drive plate 20 from the mounting plate 11. Thus, the fine adjustment is accomplished using the alignment block 17 and the primary adjustment is accomplished using the 3-position spacer 94.

Referring back to FIG. 1, the 3-position spacer 94 includes three recesses 96a, 96b, and 96c. The 3-position spacer 94 is positioned between the alignment block 17 and the movable drive plate 20 to provide one of three positions for the movable drive plate 20. The movable drive plate 20 is guided into position relative to the mounting plate 11 by engaging the guide pins 18a and 18b with respective holes 98a and 98b. The 3-position spacer 94 includes visual indicators 100a, 100b, and 100c, which correspond to three different tape widths. Each of the visual indicators 100a, 100b, and 100c indicates a corresponding position of the 3-position spacer 94 (and thus a corresponding spacing between the movable drive plate 20 and the mounting plate 11 as provided by the thickness t1, t2, and t3) when it is aligned with a recessed mark 104 formed on the top surface of the movable drive plate 20. When the desired visual indicator 100a, 100b, or 100c is aligned with the recessed mark 104, the movable drive plate 20 is secured to the alignment block 17 and the mounting plate 11 using a screw 106. In this embodiment, the visual indicators 100a, 100b, and 100c are flat portions formed on the 3-position spacer 94, for example, by machining of the 3-position spacer 94. In another embodiment, the actual tape-widths in mm are engraved on the visual indicators 100a, 100b, and 100c.

The movable drive plate 20 also includes access holes 101a and 101b. The screws 14a and 14b are tightened or loosened using an Allen wrench extended through access holes 101a and 101b, respectively. By removing screws 14a, 14b, and 14c, the feeder system 10 can be easily separated from the main frame 13.

Referring now to FIG. 2, therein is shown another isometric view of the feeder system 10 constructed according to one or more embodiments. For simplicity of illustration, the mounting plate 11 and the main frame 13 are not shown.

The guide carrier 38 is shown mounted to the movable drive plate 20 using three screws 107.

The tape guide 40 includes a guide mechanism 108 for accommodating the edges of the tape 24. In an embodiment, the guide mechanism 108 includes a groove.

The 3-position spacer 94 is mounted to the movable drive plate 20 using a shoulder screw 110 which allows the 3-position spacer 94 to rotate about an axis of the shoulder screw 110. To keep the 3-position spacer 94 in one of the three positions, the movable drive plate 20 includes a securing device 112, such as a locating spring-loaded ball plunger. In an embodiment, the securing device 112 is on the back surface of the movable drive plate 20 such that it engages in one of the three recesses 96a, 96b, and 96c (as shown in FIG. 1) and prevents the 3-position spacer 94 from rotating even when the screw 106 is not tightened.

The tape-presence sensor assembly 48 includes the tape-presence sensor roller 49 rotatably mounted to the sensor pin 50 (as illustrated in FIG. 1) and secured by a screw 49a, the pivot pin 51 supporting the sensor pin 50 and a sensor flag plate 114, and a slot sensor 116 mounted to the movable drive plate 20.

The cover tape 24a is routed around the tape-presence sensor roller 49. As the cover tape 24a is pulled by the cover tape mechanism 47 (as shown in FIG. 3) and removed from the tape 24, it causes the sensor pin 50 to rotate the sensor flag plate 114 up and clear a slot in the slot sensor 116. If the tension on the cover tape 24a is relieved, the sensor flag plate 114 rotates around the pivot pin 51 and blocks the slot sensor 116 under its own weight. This indicates that that the cover tape 24a is not removed from the tape 24 or is damaged, and that the micro device at the pick-point is not exposed from underneath the cover tape 24a. An error signal is sent to the host computer to indicate an error and alert operators that human intervention may be required to correct the error.

Referring now to FIG. 3, therein is shown a side view of the feeder system 10 according to one or more embodiments. For simplicity of illustration, the main frame 13 is not shown. The tape 24 is shown represented by an arrow showing its linear path through the feeder system 10. The tape 24 is threaded by its edges along the guide mechanism 36 (as shown in FIG. 1) of the movable drive plate 20 and the guide mechanism 108 (as shown in FIG. 2) of the tape guide 40. The cover tape removal mechanism 45 functions as a peeler for removing the cover tape 24a. The cover tape 24a is routed around the tape-presence sensor roller 49 and then connected to the cover tape mechanism 47. The cover tape mechanism 47 applies tension to the cover tape 24a to assure that it is peeled off of the carrier tape 24b. The peeling off of the cover tape 24a exposes the micro devices on the carrier tape 24b. In an embodiment, the cover tape mechanism 47 includes a powered spool, which is activated to wind the cover tape 24a during advancing of the tape 24.

Figure 4:
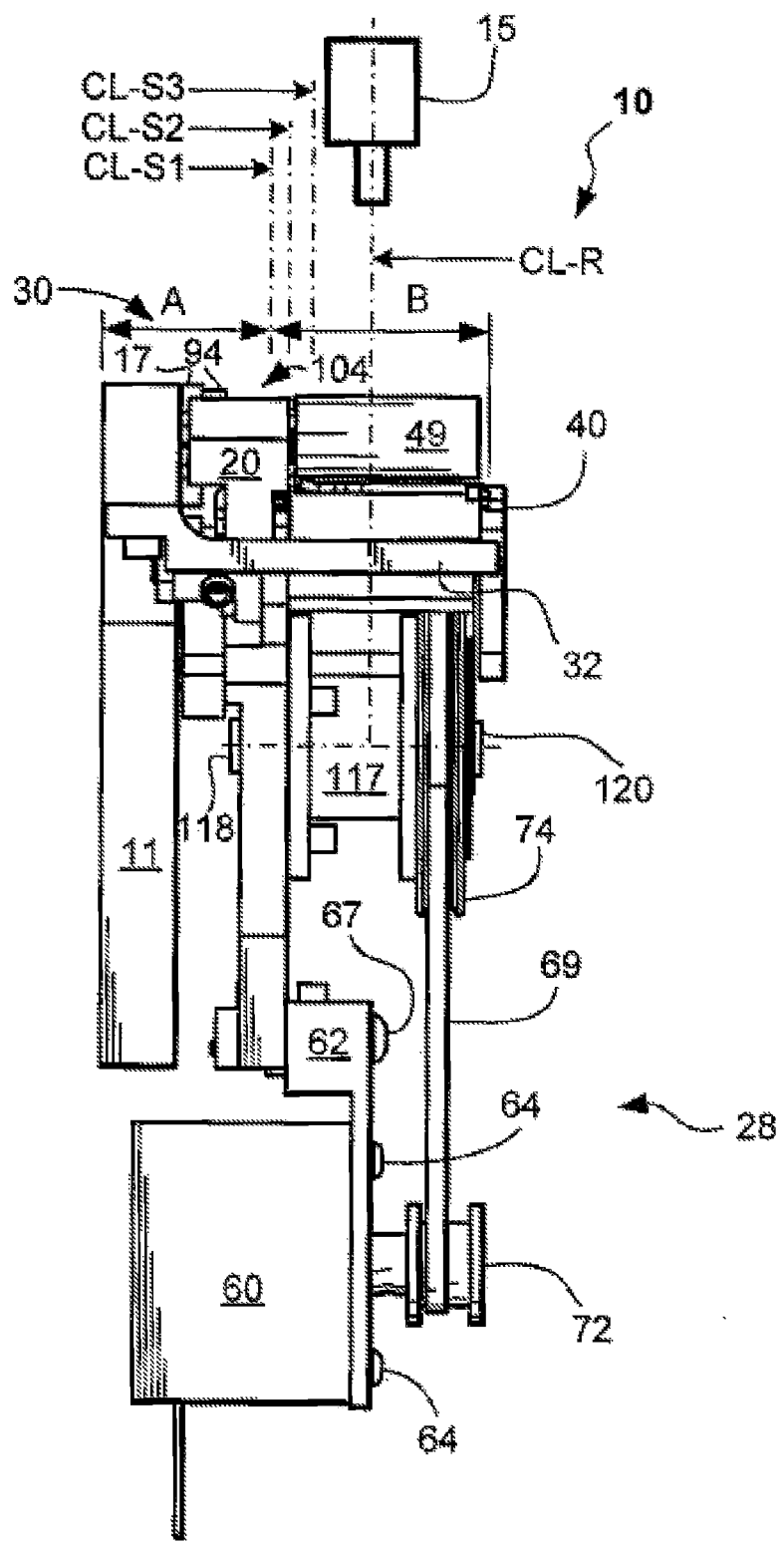
FIG. 4 is a side view of FIG. 3 taken along line 4-4 in accordance with one or more embodiments.

Referring now to FIG. 4, therein is shown a side view of the feeder system 10 along line 4-4 of FIG. 3. For simplicity of illustration, the main frame 13 is not shown.

The drive mechanism 28 also includes a sprocket shaft 117, which is secured the movable drive plate 20 by a bolt 118 and to which the sprocket pulley 74 is secured using a bolt 120.

The feeder width adjustment mechanism 30 includes the alignment block 17 and the 3-position spacer 94. As an example, aligning the three visual indicators 100a, 100b, and 100c (as shown in FIG. 1) with the recessed mark 104 on the movable drive plate 20 allows the movable drive plate 20 to be positioned so the sprocket 26 can be located with three different centerlines CL-S1, CL-S2, and CL-S3 for engaging the perforations of three different width tapes. Dimension A depends on the position of the 3-position spacer 94 and the alignment block 17. Dimension B depends on the pairs of projections 54a and 54b, 56a and 56b, and 58a and 58b that are engaged with the tape guide 40. The centerline CL-R of the robotic handling system 15 is the common centerline of the different width tapes 24 and the centerline CL-R is not effected by movement of the movable drive plate 20 and the tape guide 40; i.e., the centerline of a pick and place mechanism will not be effected for different width tapes. Accordingly, the feeder system 10 in the example is capable of handling tapes with three different tape widths.

Example Operation

First, an operator determines the size of the micro devices to be processed and the corresponding width of the tape used to contain the micro devices.

To align the feeder mechanism 16 with the robotic handling system 15, the screw 106 is loosened. The movable drive plate 20 is moved away from the alignment block 17 by sliding along the pins 18a and 18b. According to the tape widths of the micro devices to be processed, the 3-position spacer 94 is rotated to one of the three positions by hand or by using a suitable tool. When the desired visual indicator (100a, 100b, or 100c) is aligned with the recessed mark 104, the movable drive plate 20 is moved back to contact the alignment block 17. The movable drive plate 20 is now at the desired spacing from the mounting plate as determined by the 3-position spacer 94. Since the movable drive plate 20 carries the sprocket 26, adjustment of the 3-position spacer 94 provides a positive location of the sprocket 26 for the desired tape width. The screw 106 is then tightened. The securing device 112 engages with one of the three recesses 96a, 96b, and 96c to prevent the 3-position spacer 94 from rotating freely.

Fine adjustment of the feeder mechanism 16 can be achieved by adjusting the position of the alignment block 17 in the X-direction. To adjust the position of the alignment block 17, the screw 106 is loosened. Next, the screw 88 is loosened using a small Allen wrench extended through the hole 90. A screwdriver may be used to push against the top slot 84 of the alignment block 17 to move it left or right to provide adjustment in its position. After the feeder mechanism 16 is precisely aligned with the robotic handling system 15, the screw 88 is then tightened.

Next, the tape guide 40 is removed and repositioned on the guide carrier 38 so that openings 52a and 52b are engaged with the appropriate pairs of projections 54a and 54b, 56a and 56b, or 58a and 58b. In this embodiment, engagement of openings 52a and 52b with the projections 54a and 54b corresponds to the centerline CL-S1. Engagement of openings 52a and 52b with the projections 56a and 56b corresponds to the centerline CL-S2, and engagement of openings 52a and 52b with the projections 58a and 58b corresponds to the centerline CL-S3.

It will be understood that the exact order of the above operations is not critical. After the tape guide 40 is properly positioned, the feeder system 10 is ready for operation.

After the feeder system 10 is aligned with the pick-and-place system in the product assembly line, the operator feeds the tape 24 into the feeder mechanism 16. The perforations formed on one side of the tape 24 engage with teeth of the sprocket 26. The cover tape 24a is threaded between the cover tape removal mechanism 45 and the tape-presence sensor roller 49, and connected to the cover tape mechanism 47. The motor 60 is turned on and the sprocket 26 rotates to drive the tape 24 while the cover tape mechanism 47 applies tension to the cover tape 24a to assure that it is peeled off of the carrier tape 24b. The micro devices on the tape 24 are presented in the proper position to the pick-and-place system.

Thus, one or more embodiments provide a micro device feeder system, which is easily adjustable to accommodate micro devices supplied on tape with different widths and is simple and inexpensive.

From the above it will be understood that one or more embodiments are applicable to what can be described as "micro devices". However, one or more embodiments may be employed for processing a variety of electronic, mechanical, hybrid, and other devices, which undergo testing, measurement of device characteristics, calibration, and other processing operations. For example, these types of micro devices may include, but not be limited to, devices such as microprocessors, integrated circuits (ICs), application specific integrated circuits (ASICs), micro mechanical machines, micro-electro-mechanical (MEMs) devices, micro modules, and fluidic systems.

While a variety of embodiments have been described, it is to be understood that many alternatives, modifications, and variations will be apparent to those skilled in the art in light of the foregoing description. Accordingly, it is intended to embrace all such alternatives, modifications, and variations that fall within the spirit and scope of the included claims. All matters set forth herein or shown in the accompanying drawings are to be interpreted in an illustrative and non-limiting sense.

What is claimed is:

1. A micro device feeder comprising:
    a mounting plate;
    a movable drive plate coupled to the mounting plate;
    an input mechanism mounted on the movable drive plate, wherein the input mechanism is configured to receive micro devices on a tape; and
    a feeder-width adjustment mechanism including an angled alignment block interposed between the mounting plate and the movable drive plate, wherein the feeder-width adjustment mechanism is configured to adjust the micro device feeder to feed tapes with different widths.

2. The micro device feeder of claim 1, wherein the input mechanism is further configured to be driven by a drive mechanism.

3. The micro device feeder of claim 1, further comprising a drive mechanism configured to drive the input mechanism.

4. The micro device feeder of claim 1, wherein the feeder-width adjustment mechanism further comprises a multi-position spacer configured to be used for primary adjustment of micro device feeder widths, and wherein the angled alignment block is configured to be used for fine adjustment of micro device feeder widths.

5. The micro device feeder of claim 4, wherein the multi-position spacer comprises a plurality of thicknesses, and wherein each of the plurality of thicknesses is configured to determine a position of the movable drive plate with respect to the mounting plate.

6. The micro device feeder of claim 1, wherein the input mechanism comprises a sensor flag plate configured to indicate one or more of:
    that a cover portion of the tape is present; or
    that the cover portion of the tape is damaged.

7. The micro device feeder of claim 6, wherein the sensor flag plate is further configured to trigger an error signal if the cover portion of the tape is either present or damaged.

8. A micro device feeder for feeding micro devices on a tape, the micro device feeder comprising:
    an input mechanism configured to receive the tape having micro devices thereon and further configured to be driven by a drive mechanism; and a feeder-width adjustment mechanism operably associated with the input mechanism and including an angled alignment block, wherein the feeder-width adjustment mechanism is configured to adjust the micro device feeder to accommodate tapes with different widths.

9. The micro device feeder of claim 8, wherein the feeder-width adjustment mechanism further comprises a multi-position spacer configured to be used for primary adjustment of the micro device feeder width, and wherein the angled alignment block is configured to be used for fine adjustment of the micro device feeder width.

10. The micro device feeder of claim 9, wherein the multi-position spacer comprises a plurality of visual indicators, and wherein each of the visual indicators is configured to indicate that the micro device feeder has been adjusted for a particular tape width.

11. The micro device feeder of claim 8, wherein the input mechanism comprises:
a guide carrier configured to support the tape within the micro device feeder; and
a tape guide removably attached to the guide carrier via one or more magnets, wherein the tape guide is configured to guide an edge portion of the tape in the input mechanism.

12. The micro device feeder of claim 11, wherein the tape guide is configured to be repositioned on the guide carrier to accommodate a plurality of different tape widths.

13. The micro device feeder of claim 8, further comprising a drive mechanism having a drive motor configured to advance the tape within the micro device feeder.

14. An apparatus comprising:
means for feeding a tape having micro devices thereon; and
means for adjusting a width of the means for feeding, wherein the means for adjusting includes an angled alignment block configured to adjust the means for feeding to accommodate tapes with different widths.

15. The apparatus of claim 14, further comprising:
means for coarse adjustment of the means for adjusting, wherein the angled alignment block is configured to be used for fine adjustment of the means for adjusting.

16. The apparatus of claim 14, further comprising:
means for visually indicating that the means for feeding has been adjusted for a particular tape width.

17. The apparatus of claim 14, further comprising:
means for supporting the tape within the means for feeding; and
means for guiding an edge portion of the tape in the means for feeding, wherein the means for guiding is configured to be removably attached to the means for supporting.

18. The apparatus of claim 17, wherein the means for guiding is configured to be repositioned on the means for supporting to accommodate a plurality of different tape widths.

19. The apparatus of claim 14, further comprising:
means for triggering an error signal if a cover portion of the tape is either present or damaged.

20. The apparatus of claim 14, further comprising:
means for advancing the tape through the means for feeding.

* * * * *

UNITED STATES PATENT AND TRADEMARK OFFICE
CERTIFICATE OF CORRECTION

| | | |
|---|---|---|
| PATENT NO. | : 8,079,396 B2 | |
| APPLICATION NO. | : 12/348843 | |
| DATED | : December 20, 2011 | |
| INVENTOR(S) | : Rachkov | |

It is certified that error appears in the above-identified patent and that said Letters Patent is hereby corrected as shown below:

IN THE SPECIFICATIONS:
In Column 4, Line 63, delete "0°" and insert -- $\theta°$ --, therefor.

In Column 4, Line 66, delete "0°" and insert -- $\theta°$ --, therefor.

In Column 5, Line 18, delete "0°" and insert -- $\theta°$ --, therefor.

IN THE CLAIMS:
In Column 9, Line 27, in Claim 12, delete "configured" and insert -- further configured --, therefor.

Signed and Sealed this
Nineteenth Day of June, 2012

David J. Kappos
*Director of the United States Patent and Trademark Office*